United States Patent [19]  
Englebrecht et al.

[11] 3,883,435  
[45] May 13, 1975

[54] CHROMATOGRAPHIC SHEETS AND FILMS AND ADSORBENT THEREFOR

[76] Inventors: Bruno Englebrecht, Langemarckstr. 31; Hans Walker, Lindenweg 10, both of Eschwege; Johannes Blome, Rohgraben 11, Grebendorf; Friedemann Jordan, Johannuplatz 4a, Buhl, Baden, all of Germany

[22] Filed: Jan. 23, 1973

[21] Appl. No.: 326,127

Related U.S. Application Data

[62] Division of Ser. No. 130,822, April 2, 1971, Pat. No. 3,726,405.

[30] Foreign Application Priority Data

Apr. 2, 1970   Germany............................ 2015672

[52] U.S. Cl................................ 210/502; 252/449  
[51] Int. Cl............................................. B01d 15/08  
[58] Field of Search...... 210/496, 31 C, 198 C, 502; 252/449, 451, 455 R

[56] References Cited  
UNITED STATES PATENTS 2,563,650   8/1951   Heinemann..................... 252/455 R  
2,603,609   7/1952   Heinemann......................... 252/451  
3,475,375   10/1969  Yates................................... 252/449

OTHER PUBLICATIONS

The Colloid Chemistry of Silica and Silicates, by Ralph Iler, Cornell University Press, Ithaca, N. Y. 1955, pp. 166–168 relied on.

*Primary Examiner*—John Adee  
*Attorney, Agent, or Firm*—Connolly and Hutz

[57] ABSTRACT

An adsorbent for a chromatographic sheet or film containing an adsorption active powder and 1 to 50 percent by weight of silicic acid in the form of a silica sol having a content of from 1 to 15 percent of colloidal silicic acid based on the weight of said adsorption active powder and chromatographic sheets and films based on the same.

3 Claims, No Drawings

CHROMATOGRAPHIC SHEETS AND FILMS AND ADSORBENT THEREFOR

CROSS REFERENCE TO RELATED APPLICATION

This application is a division of application Ser. No. 130,822, filed Apr. 2, 1971 now U.S. Pat. No. 3,726,405.

This invention relates to sheets and films for chromatography, particularly thin layer chromatography and to an adsorbent therefor.

In the prior art production of sheets and films for thin layer chromatography, the base or substrate is spread with an aqueous paste prepared from an adsorbent consisting of silica gel, kieselguhr or aluminum oxide and a binder. The coated base is then dried at room temperature and in many cases subsequently activated at increased temperatures of from 100° to 200°C. The binders used in the prior art adsorbent comprise either colloidal solutions of various organic compounds or inorganic binders such as calcium sulfate, water-soluble silicates or potassium salts.

The prior art sheets or films prepared by means of adsorbents based on organic binders have the disadvantage that, in the spot detection, no reaction can be carried out which is accompanied by decomposition of the organic binder compound. For example when using such sheets, permanganate, concentrated acids and halogens often cannot be used as detecting agents.

On the other hand, prior art sheets or films prepared by means of adsorbents based on the aforesaid inorganic binders suffer from the disadvantage that the cation content or pH value thereof does not permit unrestricted use. For example, when sheets containing plaster as binder are used, substances forming difficultly soluble calcium salts or sulfates are retained at the starting point of the chromatogram.

The binder used in the German published application DAS 1,256,918 is finely divided silicium dioxide having a particle size of from 3 to 50 $\mu$. The silicium dioxide powder consists of coagulated and coherent particles, only about 0.02 percent of which is water-soluble. As compared to plaster as binder, said silicium dioxide powder provides an improved adherence of the adsorbent layer to the glass sheet. However, the adsorbent layer displays low abrasion resistance on the surface so that the sheets are easily damaged when stacked, packed or transported.

The principal object of the present invention is to eliminate the disadvantages of the sheets and films heretofore used in chromatography and, in particular, to improve the abrasion resistance and purity thereof. The sheets and films prepared according to the present invention exhibit sufficient abrasion resistance that it is possible to write on them when they are in the dry state. They may furthermore be activated, are insusceptible to aqueous solvents and exhibit satisfactory chromatographic separating behavior.

The excellent results obtained by the instant invention are surprising in that it was not to be expected that the sol component, in mixtures of aqueous silica sol and coarse adsorption active powder, would remain stable over relatively long periods and harden to a coherent gel structure only when dried.

The adsorbent of the present invention comprises a mixture of adsorption active powder and from 1 to 50 percent by weight of silicic acid in the form of a silica sol having a content of from 1 to 15 percent of colloidal silicic acid, based on the weight of adsorption active powder. Preferably, the silica sol contains from 5 to 20 percent by weight of silicic acid. Examples of suitable adsorption active powders include silica gel, aluminum oxide, kieselguhr and magnesium silicate. The preferred adsorption active powder is silica gel. The preferred silica gel is a standard thin layer chromatography silica gel having a particle size of less than 50 $\mu$.

The silica sol used as binder according to the invention is a sol in which low molecular weight polymeric silicic acids are incoherently colloidally dissolved. Such silica sols have heretofore been used in, for example, the preparation of non-adhesive cellulose hydrate films or for fining wine and fruit juices. They are commerically available and represent odorless liquids which, in thin layer, are almost clear or slightly opalescent and bluish when viewed from above. They may be prepared, for example, according to the processes described by R. Griessbach in the Chemiker-Zeitung, Volume 57 (1933), pages 253 et. seq. A typical preparation is by peptization of purified $SiO_2$ gelatines.

When applied to the base or substrate, the adsorbent of the present invention is, if necessary, first mixed with additional water, so as to provide a spreadable paste. The spreadable paste is then applied to previously cleaned bases such as glass sheets, aluminum sheets or aluminum films and dried, in a known manner, e.g., according to E. Stahl, Dunnschichtchromatographie, Berlin-Heidelberg-Gottingen 1962.

By dehydration, the colloidally dissolved polymeric silicic acids are converted to the dry gel via a lyogel. The coarse particles of the adsorption active powder are incorporated into the structure of the lyogel and hardened while the lyogel is dried. The binding principle in the process of the invention is based on the addition of polymeric silicic acids dissolved in water, which form large area gel network structures by a repeated colloidal-chemical reaction, the coarse particles of the adsorption active powder being incorporated into these network structures and abrasion resistant layers being produced on the bases during the transition of the lyogel to xerogel.

The products of this invention may be used in layer chromatography, either previously activated or not. Activation is obtained, for example, by heating to temperatures of from 100° to 200°C.

Particularly good results with respect to abrasion resistance, minimum splintering tendency, resistance to being written on, resistance to water, etc. are obtained when using absorbents consisting of a mixture of 1 part by weight of silica gel DC and 2 parts by weight of a 4.5 percent silica sol solution or of a mixture of 2 parts by weight of aluminum oxide DC with 3 parts by weight of a 5 percent silica sol solution.

The following examples are illustrative of the invention:

EXAMPLE 1

100 g. of silica gel DC were mixed by stirring with an amount of silica sol corresponding to 8 g. of silicium dioxide and with a total of 200 g. of $H_2O$. The spreadable mass was spread on previously cleaned glass sheets according to E. Stahl, Dunnschichtchromatographie, Berlin-Heidelberg-Gottingen 1962, and the coated sheets were air-dried. The resulting layer was abrasion-

EXAMPLE 2

6 g. of a 15 percent silica sol and 14 g. of water were added to 10 g. of silica gel DC. Upon thorough mixing the mass was spread on aluminum films in conventional manner. By exposing the films to air, the water was evaporated. The resulting layer was abrasion-resistant and could be used in layer chromatography.

EXAMPLE 3

100 g. of silica gel DC were mixed by stirring with an amount of silica sol corresponding to 10 g. of silicium dioxide and with 200 g. of $H_2O$. The mass was spread on previously cleaned glass sheets in a known manner and the coated sheets were air-dried. The resulting layer was abrasion-resistant and could be used in layer chromatography, either previously activated or not.

EXAMPLE 4

To 100 g. of aluminum oxide DC was added a silica sol solution in an amount sufficient to provide 1.5 percent by weight of $SiO_2$ per 100 g. of aluminum oxide. 120 ml of water was added thereto. The spreadable mass was spread on previously cleaned glass sheets in a known manner, and the coated sheets were air-dried. The resulting layer was abrasion-resistant and could be used in layer chromatography, either previously activated or not.

What is claimed is:

1. An adsorbent for a chromatographic sheet or film, said adsorbent comprising a mixture of adsorption active silica gel powder and from 1 to 50 percent by weight of silicic acid in the form of a silica sol having a content of from 1 to 15 percent of colloidal silicic acid, based on the weight of said adsorption active powder.

2. The adsorbent of claim 1 wherein said silica sol has a content of from 5 to 20 percent by weight of silicic acid based on the weight of said adsorption active powder.

3. The adsorbent of claim 1 wherein said adsorption active powder is silica gel having a particle size of less than 50 $\mu$.

* * * * *